(12) United States Patent
Shih

(10) Patent No.: US 7,947,525 B2
(45) Date of Patent: May 24, 2011

(54) MANUFACTURING METHOD FOR A LIQUID CRYSTAL DISPLAY

(75) Inventor: Ming-Hung Shih, Tao Yuan Shien (TW)

(73) Assignee: AU Optronics Corporation, Hsin-Chu (TW)

( * ) Notice: Subject to any disclaimer, the term of this patent is extended or adjusted under 35 U.S.C. 154(b) by 1120 days.

(21) Appl. No.: 11/553,535

(22) Filed: Oct. 27, 2006

(65) Prior Publication Data

US 2007/0238217 A1    Oct. 11, 2007

(30) Foreign Application Priority Data

Apr. 11, 2006    (TW) .............................. 95112880 A

(51) Int. Cl.
*H01L 21/00* (2006.01)

(52) U.S. Cl. ................ 438/69; 438/27; 438/29; 438/30; 438/70; 257/72; 257/E29.147; 349/10; 349/30; 349/38; 349/42; 349/44

(58) Field of Classification Search .................... 438/27, 438/29, 69, 70, 30; 257/E29.147; 349/38, 349/42, 106, 44

See application file for complete search history.

(56) References Cited

U.S. PATENT DOCUMENTS

| | | | | |
|---|---|---|---|---|
| 6,063,653 A * | 5/2000 | Lin et al. | | 438/160 |
| 6,113,449 A * | 9/2000 | Sung et al. | | 445/24 |
| 6,424,397 B1 * | 7/2002 | Kuo | | 349/139 |
| 6,436,740 B1 * | 8/2002 | Jen et al. | | 438/149 |
| 6,532,050 B1 | 3/2003 | Kim et al. | | |
| 6,750,131 B2 * | 6/2004 | French et al. | | 438/609 |
| 6,818,535 B2 * | 11/2004 | Lu et al. | | 438/585 |
| 6,927,815 B2 * | 8/2005 | Lai | | 349/108 |
| 7,098,062 B2 * | 8/2006 | Shih | | 438/30 |
| 7,190,419 B2 * | 3/2007 | Park | | 349/43 |
| 7,196,352 B2 * | 3/2007 | Hung et al. | | 257/59 |
| 7,417,373 B2 * | 8/2008 | Yamazaki | | 313/506 |

(Continued)

FOREIGN PATENT DOCUMENTS

JP    10-079514    3/1998

(Continued)

OTHER PUBLICATIONS

English language translation of abstract of JP 10-079514 (published Mar. 24, 1998).

(Continued)

*Primary Examiner* — Matthew C Landau
*Assistant Examiner* — Vicki B Booker
(74) *Attorney, Agent, or Firm* — Thomas, Kayden, Horstemeyer & Risley, LLP

(57) ABSTRACT

A method for manufacturing a liquid crystal display includes the following steps. First, source/drain and a bottom electrode are formed over a color filter substrate with a color filter layer. The next step forms source/drain junction regions over the source/drain. A channel region is also formed between the source/drain in this step. A gate dielectric layer and a gate are formed over the channel region and the source/drain junction regions in this step as well. Moreover, a plurality of stack layers and an upper electrode are formed over the bottom electrode in this step, too. Then, a pixel electrode is formed to electrically connect one of the source/drain and the bottom electrode. Then, a passivation layer pattern is formed to cover the source/drain, the gate, the upper electrode and the bottom electrode by backside exposure. Finally, a plurality of steps are performed to finish the liquid crystal display.

9 Claims, 8 Drawing Sheets

U.S. PATENT DOCUMENTS

| | | | |
|---|---|---|---|
| 2001/0005245 A1 | 6/2001 | Sakamoto et al. | |
| 2003/0076456 A1 | 4/2003 | Lee et al. | |
| 2006/0033862 A1* | 2/2006 | Huang et al. | 349/110 |
| 2006/0125381 A1* | 6/2006 | Oh | 313/504 |
| 2009/0026457 A1* | 1/2009 | Okada et al. | 257/59 |

FOREIGN PATENT DOCUMENTS

| | | |
|---|---|---|
| JP | 10-135480 | 5/1998 |
| JP | 2001166338 | 6/2001 |
| KR | 20020054610 | 7/2002 |
| KR | 1020020051984 | 7/2002 |
| KR | 20040050237 | 6/2004 |
| KR | 20040050311 | 6/2004 |

OTHER PUBLICATIONS

English language translation of abstract of JP 10-135480 (published May 22, 1998).

English language translation of abstract of KR 1020020051984, Jul. 7, 2002.

English language translation of abstract of JP 2001166338, Jun. 22, 2001.

English language translation of abstract of KR 20040050237, Jun. 16, 2004.

English language translation of abstract of KR 20020054610, Jul. 8, 2002.

English language translation of abstract of KR 20040050311, Jun. 16, 2004.

* cited by examiner

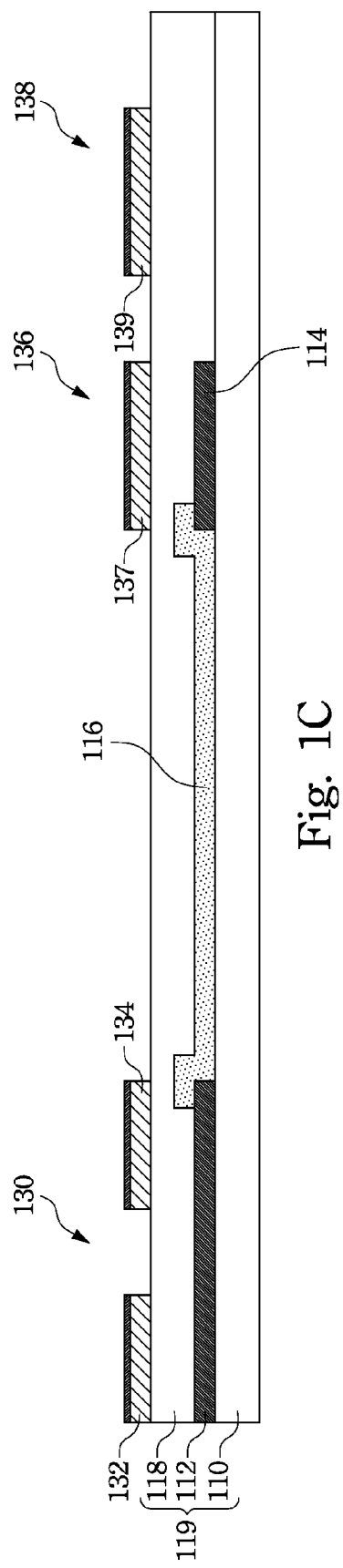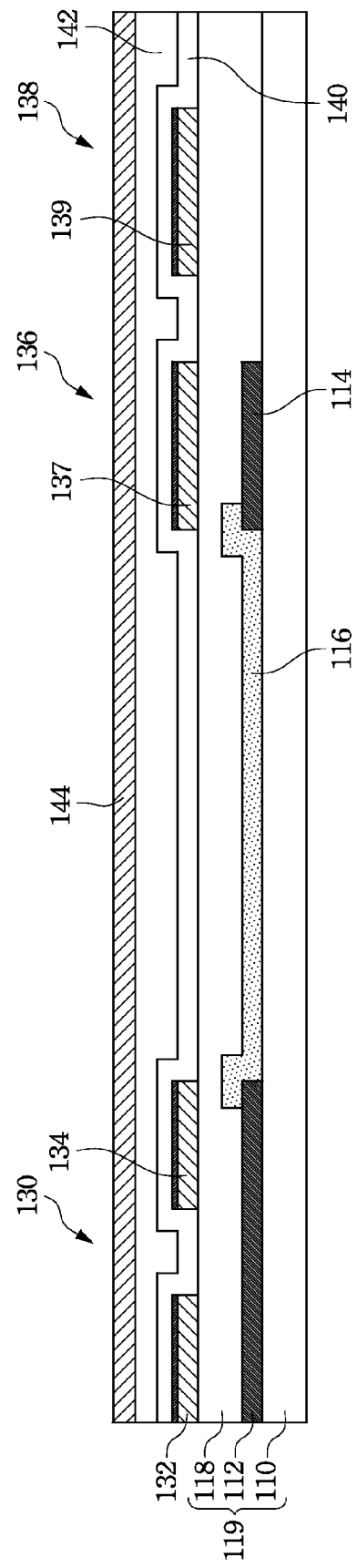

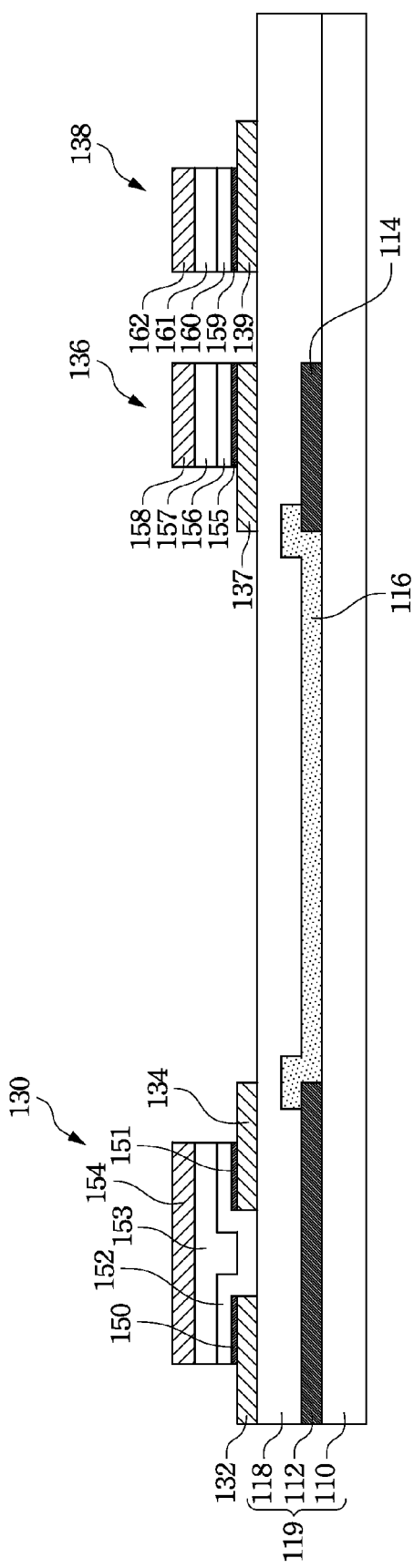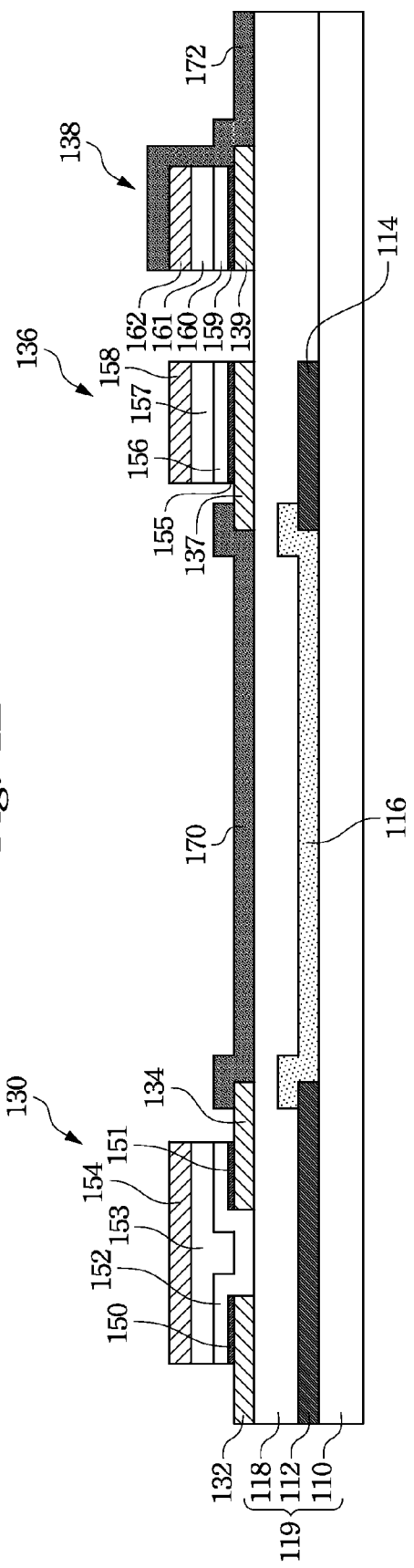

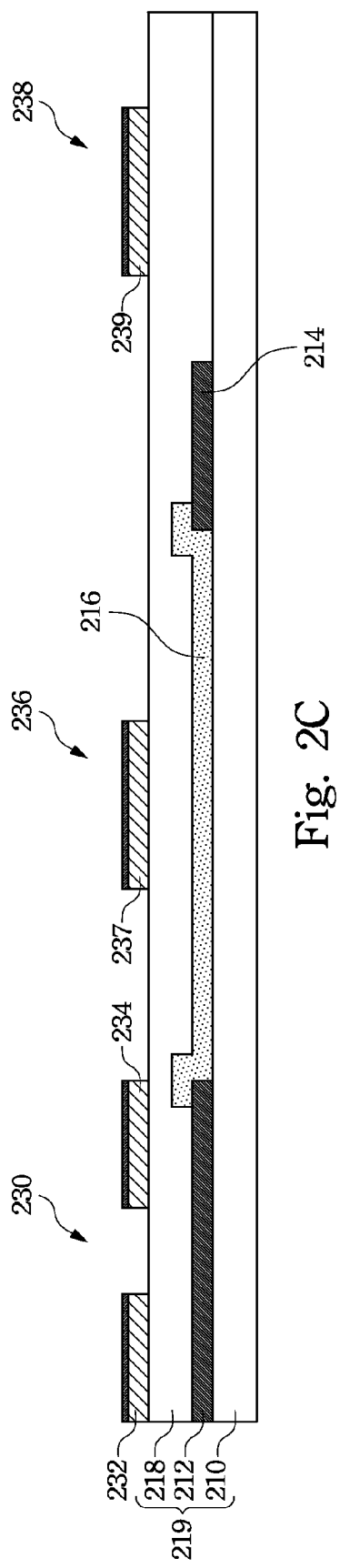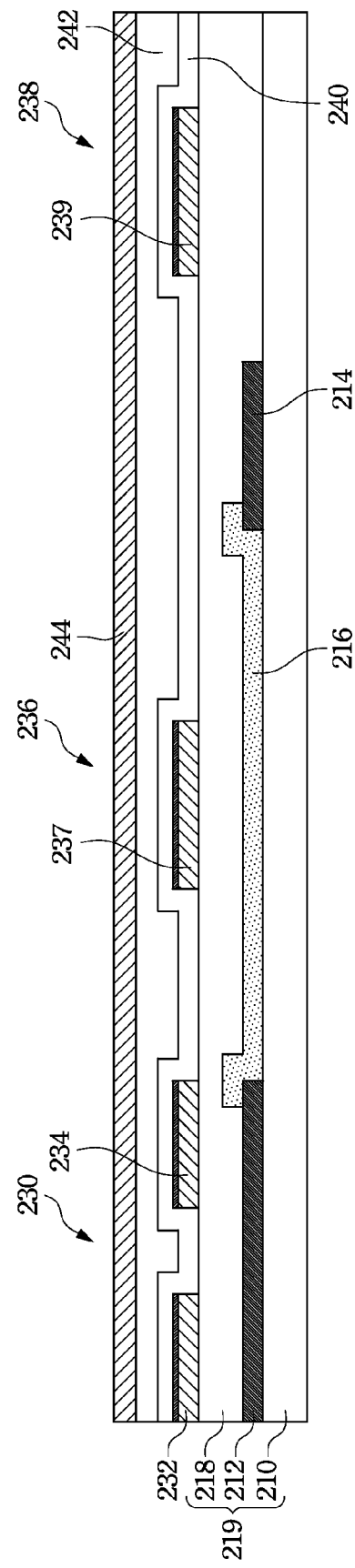

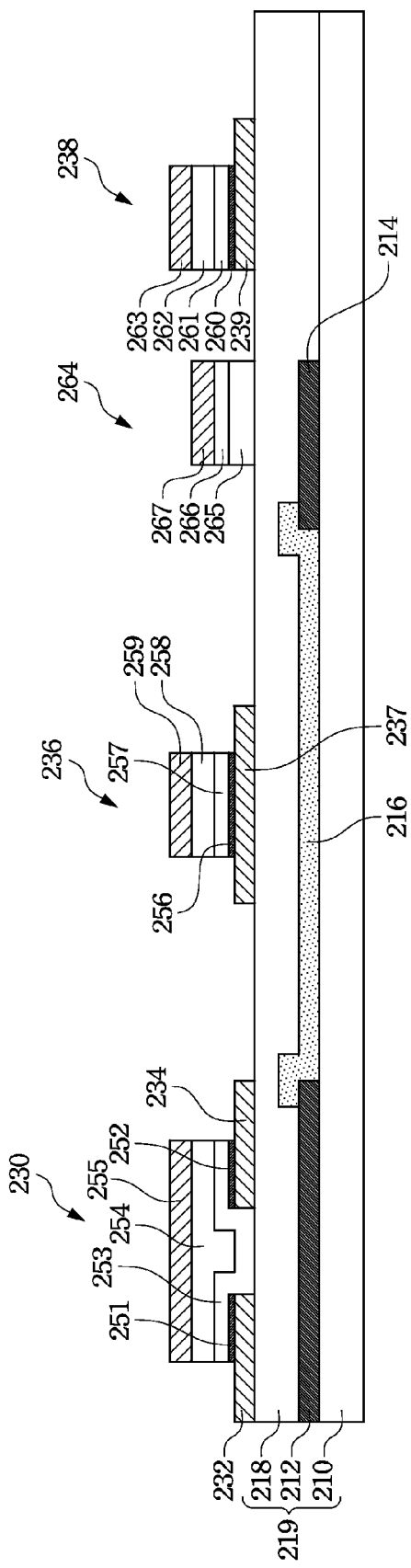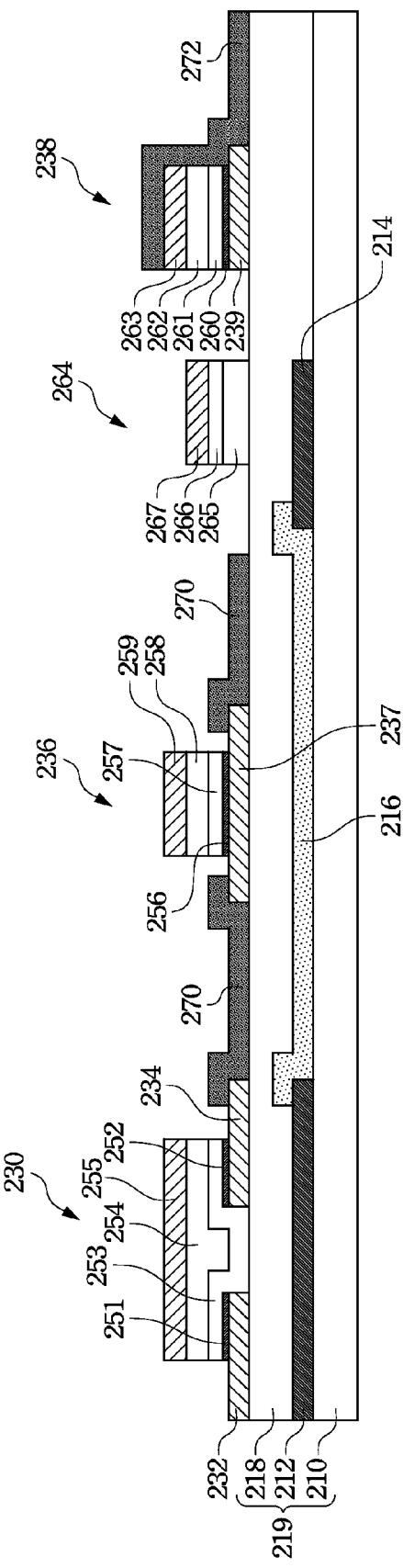

MANUFACTURING METHOD FOR A LIQUID CRYSTAL DISPLAY

RELATED APPLICATIONS

The present application is based on, and claims priority from, Taiwan Application Serial Number 95112880, filed Apr. 11, 2006, the disclosure of which is hereby incorporated by reference herein in its entirety.

BACKGROUND

1. Field of Invention

The present invention relates to a liquid crystal display. More particularly, the present invention relates to a method for forming thin film transistor arrays on a color filter.

2. Description of Related Art

Liquid crystal displays (LCD) have been widely applied in electrical products because of their high image quality, compact size, light weight, low driving voltage and low power consumption. LCDs have been introduced into portable computers, personal digital assistants and color televisions and are becoming the mainstream display apparatus.

A conventional LCD includes a transistor array substrate, a color filter substrate and liquid crystals filled between the transistor array substrate and the color filter substrate. The transistor array substrate and the color filter substrate have to be aligned properly because each of the transistors on the transistor array substrate should be aligned with one of the color filters on the color filter substrate. As the size of the LCD becomes increasingly larger, aligning the transistor array substrate with the color filter substrate is increasingly more difficult.

Furthermore, the LCD manufacturer takes great effort to reduce the use of masks because masks are very expensive, and steps of exposing and developing are time consuming and have many risks about aligning error. Half tone masks are developed to reduce the use of masks. However, the manufacturing cost and risks of the half tone masks are more than the conventional masks.

For the forgoing reasons, there is a need for a method for manufacturing an LCD, which can reduce the use of the masks without employing half tone masks, and reduce the difficulties in aligning the transistor array substrate and the color filter substrate.

SUMMARY

It is therefore an objective of the present invention to provide a method for manufacturing an LCD. The method can reduce the number of steps needed for manufacturing an LCD. Therefore, the cost of manufacturing the LCD is decreased and the yield rate of the LCD production is improved, too.

It is another objective of the present invention to provide a method for manufacturing an LCD. The method can form thin film transistor array on a color filter substrate to solve alignment problems, which may occur when assembling the LCD.

It is still another objective of the present invention to provide a method for manufacturing an LCD. The method can reduce the use of masks without employing half tone masks. Therefore, the cost of manufacturing the LCD is decreased and the yield rate of the LCD production is improved as well.

In accordance with the foregoing and other objectives of the present invention, a method for manufacturing an LCD includes the following steps. First, a color filter substrate with a color filter layer positioned thereon is provided. Then, source/drain and a bottom electrode are formed over the color filter substrate. The next step forms source/drain junction regions over the source/drain. In this step, a channel region is also formed between the source/drain. A gate dielectric layer and a gate are formed over the channel region and the source/drain junction regions in this step as well. Moreover, a capacitor junction region, a capacitor semiconductor layer, a capacitor dielectric layer and an upper electrode are formed over the bottom electrode in this step, too. Then, a pixel electrode is formed above the color filter layer of the color filter substrate to connect one of the source/drain and the bottom electrode. Then, a passivation layer pattern is formed to cover the source/drain, the gate, the upper electrode and the bottom electrode by backside exposure. Then, an upper substrate with a common electrode positioned thereon is arranged parallel to the color filter substrate. Finally, liquid crystals are filled between the color filter substrate and the upper substrate.

In conclusion, the invention allows the thin film transistor array of the LCD to be formed on the color filter substrate. Thus, the pixel electrodes of the array are aligned with the color filter layers of the color filter substrate when assembling the LCD. Therefore, there would be fewer difficulties in assembling the LCD than the prior art. Moreover, the present invention reduces the use of masks without employing half tone masks because backside exposure is performed for forming the passivation layer pattern.

It is to be understood that both the foregoing general description and the following detailed description are by examples, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings, FIGS. 1A-1G are cross sectional views showing a method for manufacturing an LCD according to one preferred embodiment of this invention; and FIGS. 2A-2G are cross sectional views showing a method for manufacturing an LCD according to another preferred embodiment of this invention.

DESCRIPTION OF THE PREFERRED EMBODIMENTS

Figure 1A:
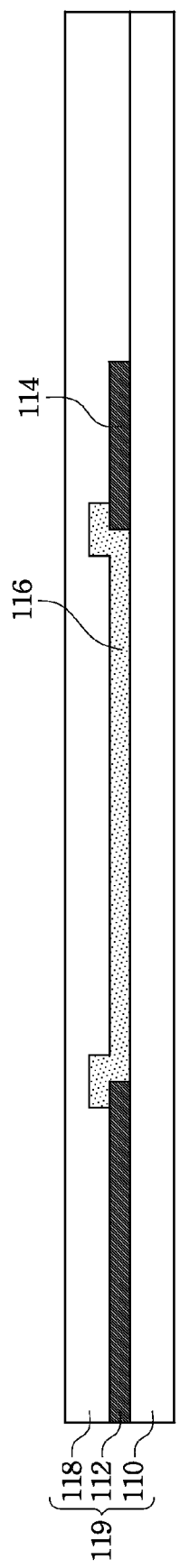

Reference will now be made in detail to the present preferred embodiments of the invention, examples of which are illustrated in the accompanying drawings. Wherever possible, the same reference numbers are used in the drawings and the description to refer to the same or like parts.

Embodiment I

Reference is made to FIGS. 1A-1G, which are cross sectional views showing a method for manufacturing LCD according to one preferred embodiment of this invention.

In FIG. 1A, black matrices 112/114, a color filter layer 116 and a flatness layer 118 are formed over a transparent substrate 110 to provide a color filter substrate 119. The color of the color filter layer 116 may be red, blue or green. The flatness layer 118 may be a transparent organic material, such as a photo resistant material.

Figure 1B:
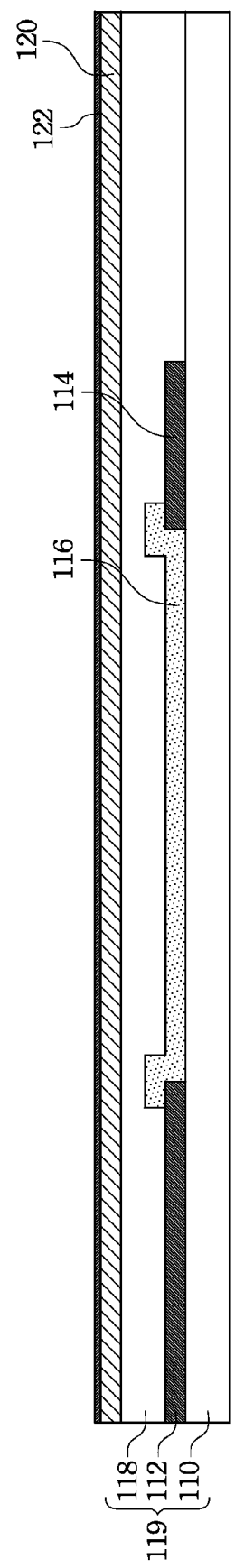

Referring to FIG. 1B, a first conductor layer 120 and a doped semiconductor layer 122 are formed over the flatness layer 118 in order. The material of the first conductor layer 120 may be molybdenum, chromium, iridium, aluminum, titanium, a combination thereof or an alloy thereof. The first conductor layer 120 may be formed by a physical vapor deposition process, such as sputtering. The material of the doped semiconductor layer 122 may be N type doped amorphous silicon.

In FIG. 1C, the doped semiconductor layer and the first conductor layer are patterned to form source/drain 132/134 of a thin film transistor 130, a bottom electrode 137 of a capacitor 136 and a bottom conductive line 139 of a terminal 138 over the flatness layer 118. As shown in FIG. 1C, the source/drain 132/134 of the thin film transistor 130 are formed above the black matrix 112 of the color filter substrate 119. The bottom electrode 137 of the capacitor 136 is formed above the black matrix 114 of the color filter substrate 119. The doped semiconductor layer and the first conductor layer may be patterned by a lithography process and an etching process.

In FIG. 1D, a semiconductor layer 140, a dielectric layer 142 and a second conductor layer 144 are formed over the source/drain 132/134, the bottom electrode 137, the bottom conductive line 139 and the flatness layer 118 in order. The material of the semiconductor layer 140 may be amorphous silicon. The material of the dielectric layer 142 may be silicon oxide, silicon nitride or a combination thereof. The dielectric layer 142 may be formed by a chemical vapor deposition process. The material of the second conductor layer 144 may be molybdenum, chromium, iridium, aluminum, titanium, a combination thereof or an alloy thereof. The second conductor layer 144 may be formed by a physical vapor deposition process, such as sputtering.

In FIG. 1E, the second conductor layer, the dielectric layer, the semiconductor layer and the doped semiconductor layer are patterned. Therefore, source/drain junction regions 150/151 are formed over the source/drain 132/134; a channel region 152 is formed between the source/drain 132/134 of the thin film transistor 130; a gate dielectric layer 153 and a gate 154 of the thin film transistor 130 are formed over the source/drain junction regions 150/151 and the channel region 152; a capacitor junction region 155, a capacitor semiconductor layer 156, a capacitor dielectric layer 157 and an upper electrode 158 of the capacitor 136 are formed over the bottom electrode 137 of the capacitor 136; and a terminal junction region 159, a terminal semiconductor layer 160, a terminal dielectric layer 161 and an upper conductive line 162 of the terminal 138 are formed over the bottom conductive line 139 of the terminal 138. A scan line can be formed in this step to electrically connect the gate 154 of the thin film transistor 130 and the upper electrode 158 of the capacitor 136 (not shown). The second conductor layer, the dielectric layer, the semiconductor layer and the doped semiconductor layer may be patterned by a lithography process and an etching process. More specifically, the source/drain junction regions 150/151, the capacitor junction region 155 and the terminal junction region 159 are ohmic contact regions to reduce the resistance of the conductors and enhance the electrical characterization of the conductors.

A transparent conductive layer is deposited above the flatness layer 118, and the transparent conductive layer is then patterned. Therefore, a pixel electrode 170 is formed above the color filter layer 116 in FIG. 1F, and a transparent conductive line 172 of the terminal 138 is also formed above the terminal 138 in this step. The pixel electrode 170 electrically connects the drain 134 of the thin film transistor 130 and the bottom electrode 137 of the capacitor 136. The transparent conductive line 172 of the terminal 138 is formed to electrically connect the upper conductive line 162 and the bottom conductive line 139 of the terminal 138 to solve RC-delay problems. The material of the transparent conductive layer may be indium tin oxide. The transparent conductive layer may be patterned by a lithography process and an etching process.

Figure 1G:
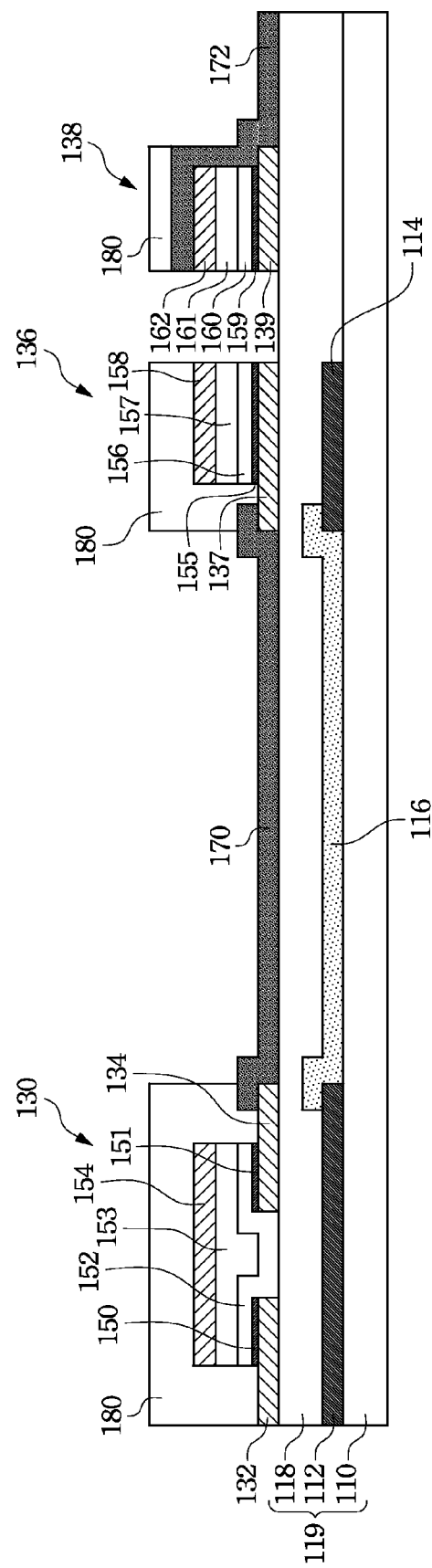

Referring to FIG. 1G, a passivation layer is formed over the flatness layer 118, and then a passivation layer pattern 180 is defined to cover the source/drain 132/134, the gate 154, the upper electrode 158, the bottom electrode 137 and the transparent conductive line 172. The passivation layer pattern 180 may be defined by a lithography process and an etching process. However, the passivation layer pattern 180 is formed without using any masks. More specifically, the passivation layer pattern 180 is formed by backside exposure. That is, light irradiates the passivation layer from the underside of the transparent substrate 110. Thus, a developing process can be performed to define the passivation layer pattern in the lithography process and the etching process. The black matrices 112/114 of the color filter substrate 119 and the bottom conductive line 139 of the terminal 138 can shield light while the transparent substrate 110, the color filter layer 116 and the flatness layer 118 of the color filter substrate 119 allows light to penetrate. Thus, the color filter substrate 119 and structures positioned thereon may be employed as a mask to form the passivation layer pattern 180 for covering the source/drain 132/134, the gate 154, the upper electrode 158, the bottom electrode 137 and the transparent conductive line 172.

After finishing the color filter substrate, an upper substrate with a common electrode positioned thereon is arranged parallel to the color filter substrate. Then, liquid crystals are filled between the color filter substrate and the upper substrate. The present invention may also employ one drop fill method. That is, the upper substrate and the color filter substrate are assembled after the liquid crystals have been filled.

Embodiment II

Reference is made to FIGS. 2A-2G, which are cross sectional views showing a method for manufacturing LCD according to another preferred embodiment of this invention.

Figure 2A:
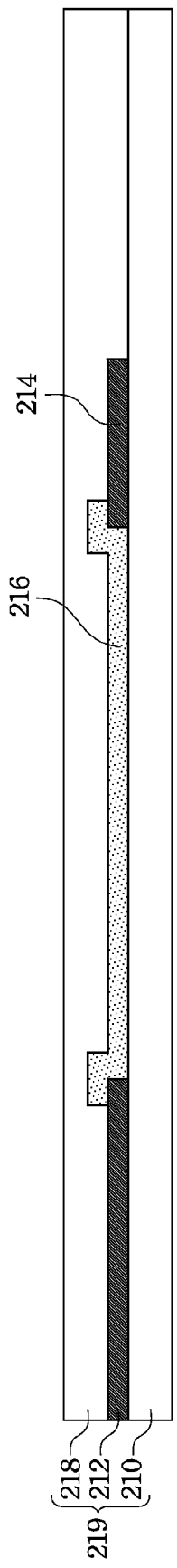

In FIG. 2A, black matrices 212/214, a color filter layer 216 and a flatness layer 218 are formed over a transparent substrate 210 to provide a color filter substrate 219. The color of the color filter layer 216 may be red, blue or green. The flatness layer 218 may be a transparent organic material, such as a photo resistant material.

Figure 2B:
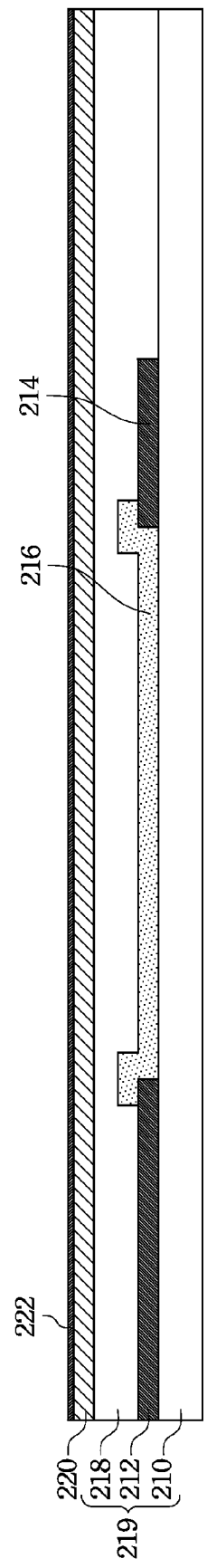

Referring to FIG. 2B, a first conductor layer 220 and a doped semiconductor layer 222 are formed over the flatness layer 218 in order. The material of the first conductor layer 220 may be molybdenum, chromium, iridium, aluminum, titanium, a combination thereof or an alloy thereof. The first conductor layer 220 may be formed by a physical vapor deposition process, such as sputtering. The material of the doped semiconductor layer 222 may be N type doped amorphous silicon.

In FIG. 2C, the doped semiconductor layer and the first conductor layer are patterned to form source/drain 232/234 of a thin film transistor 230, a bottom electrode 237 of a capacitor 236 and a bottom conductive line 239 of a terminal 238 over the flatness layer 218. As shown in FIG. 2C, the source/drain 232/234 of the thin film transistor 230 are formed above the black matrix 212 of the color filter substrate 219. The bottom electrode 237 of the capacitor 236 is formed above the color filter layer 216 of the color filter substrate 219. The doped semiconductor layer and the first conductor layer may be patterned by a lithography process and an etching process.

In FIG. 2D, a semiconductor layer 240, a dielectric layer 242 and a second conductor layer 244 are formed over the source/drain 232/234, the bottom electrode 237, the bottom conductive line 239 and the flatness layer 218 in order. The material of the semiconductor layer 240 may be amorphous silicon. The material of the dielectric layer 242 may be silicon oxide, silicon nitride or a combination thereof. The dielectric layer 242 may be formed by a chemical vapor deposition process. The material of the second conductor layer 244 may be molybdenum, chromium, iridium, aluminum, titanium, a combination thereof or an alloy thereof. The second conductor layer 244 may be formed by a physical vapor deposition process, such as sputtering.

In FIG. 2E, the second conductor layer, the dielectric layer, the semiconductor layer and the doped semiconductor layer are patterned. Therefore, source/drain junction regions 251/252 are formed over the source/drain 232/234; a channel region 253 is formed between the source/drain 232/234 of the thin film transistor 230; a gate dielectric layer 254 and a gate 255 of the thin film transistor 230 are formed over the source/drain junction regions 251/252 and the channel region 253; a capacitor junction region 256, a capacitor semiconductor layer 257, a capacitor dielectric layer 258 and an upper electrode 259 of the capacitor 236 are formed over the bottom electrode 237 of the capacitor 236; and a terminal junction region 260, a terminal semiconductor layer 261, a terminal dielectric layer 262 and an upper conductive line 263 of the terminal 238 are formed over the bottom conductive line 239 of the terminal 238. A scan line semiconductor layer 265, a scan line dielectric layer 266 and a conductive line 267 of a scan line 264 can be formed above the black matrix 214 in this step. The second conductor layer, the dielectric layer, the semiconductor layer and the doped semiconductor layer may be patterned by a lithography process and an etching process. More specifically, the source/drain junction regions 251/252, the capacitor junction region 256 and the terminal junction region 260 are ohmic contact regions to reduce the resistance of the conductors and enhance the electrical characterization of the conductors.

A transparent conductive layer is deposited above the flatness layer 218, and the transparent conductive layer is then patterned. Therefore, a pixel electrode 270 is formed above the color filter layer 216 in FIG. 2F, and a transparent conductive line 272 of the terminal 238 is also formed over the terminal 238 in this step. The pixel electrode 270 electrically connects the drain 234 of the thin film transistor 230 and the bottom electrode 237 of the capacitor 236. The transparent conductive line 272 of the terminal 238 is formed to electrically connect the upper conductive line 263 and the bottom conductive line 239 of the terminal 238 to solve RC-delay problems. The material of the transparent conductive layer may be indium tin oxide. The transparent conductive layer may be patterned by a lithography process and an etching process.

Figure 2G:
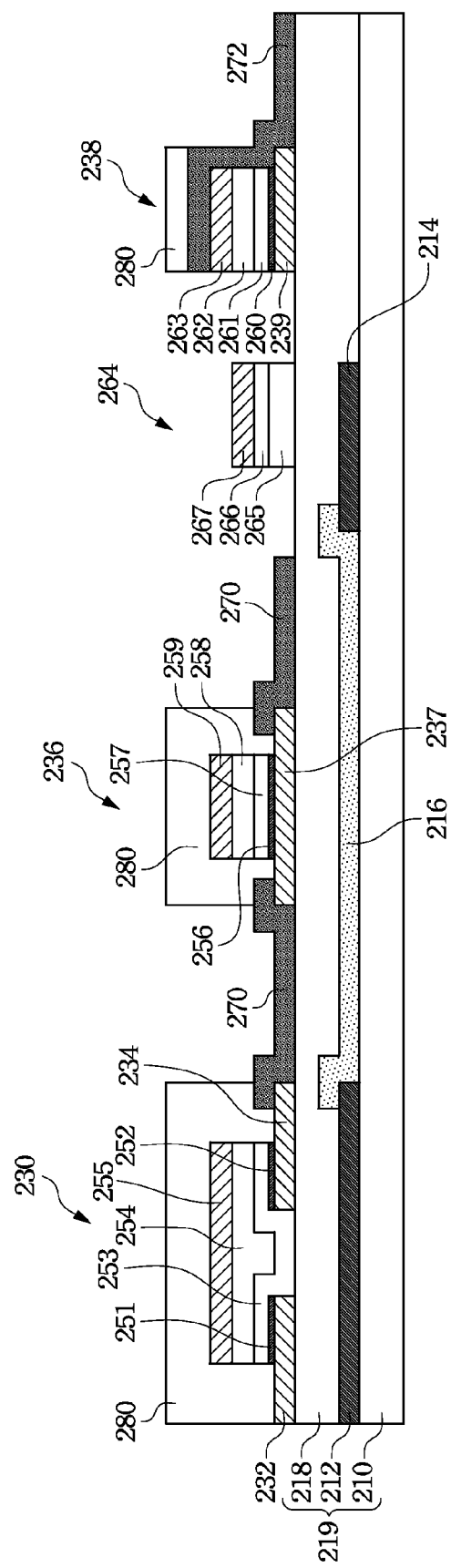

Referring to FIG. 2G, a passivation layer is formed over the flatness layer 218, and then a passivation layer pattern 280 is defined to cover the source/drain 232/234, the gate 255, the upper electrode 259, the bottom electrode 237 and the transparent conductive line 272. The passivation layer pattern 280 may be defined by the lithography process and an etching process. However, the passivation layer pattern 280 is formed without using any masks. More specifically, the passivation layer pattern 280 is formed by backside exposure. That is, light irradiates the passivation layer from the underside of the transparent substrate 210. Thus, a developing process can be performed to define the passivation layer pattern in the lithography process and etching process. The black matrices 212/214 of the color filter substrate 219, the bottom electrode 237 of the capacitor 236 and the bottom conductive line 239 of the terminal 238 can shield light while the transparent substrate 210, the color filter layer 216 and the flatness layer 218 of the color filter substrate 219 allows light to penetrate. Thus, the color filter substrate 219 and structures positioned thereon may be employed as a mask to form the passivation layer pattern 280 to cover the source/drain 232/234, the gate 255, the upper electrode 259, the bottom electrode 237 and the transparent conductive line 272.

After finishing the color filter substrate, an upper substrate with a common electrode positioned thereon is arranged parallel to the color filter substrate. Then, liquid crystals are filled between the color filter substrate and the upper substrate. The present invention may also employ one drop fill method. That is, the upper substrate and the color filter substrate are assembled after the liquid crystals have been filled.

As embodied and broadly described herein, the method for manufacturing an LCD according to the preferred embodiment of the invention has the following advantages.

(1) The present invention allows the thin film transistor array of the LCD to be formed on the color filter substrate. Thus, the pixel electrodes of the array have been aligned with the color filter layers of the color filter substrate when assembling the LCD. Thus, the problem of bad alignment is eliminated.

(2) The present invention employs backside exposure to form the passivation layer pattern. Therefore, in comparison with prior transistor array substrate manufacturing process, at least one mask is saved.

(3) The present invention reduces the use of masks without employing any half tone masks. Therefore, the cost and risks of manufacturing the LCD are decreased.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for manufacturing a thin film transistor array substrate, the method comprising:
   providing a color filter substrate comprising at least one color filter layer therein;
   forming at least one thin film transistor on the color filter substrate;
   forming a transistor passivation layer covering the thin film transistor by backside exposure;
   forming at least one capacitor on the color filter substrate;
   forming at least one capacitor passivation layer covering the capacitor by the backside exposure, wherein the transistor passivation layer and the capacitor passivation layer are formed simultaneously; and
   depositing a transparent conductive layer and patterning the transparent conductive layer to form a pixel electrode, wherein the pixel electrode electrically connects the thin film transistor and the capacitor, the pixel electrode is formed before the transistor passivation layer and the capacitor passivation layer.

2. The method of claim 1, wherein the thin film transistor has a top gate structure.

3. The method of claim 1, wherein the color filter substrate further comprises at least one black matrix located opposite the thin film transistor.

4. The method of claim 1, wherein the transistor passivation layer is formed without using a mask.

5. The method of claim 1, wherein the capacitor passivation layer is formed without using a mask.

6. The method of claim 1, wherein the color filter substrate further comprises at least one black matrix located opposite the capacitor.

7. The method of claim 1, wherein the capacitor is located opposite the color filter layer of the color filter substrate.

8. A method for manufacturing a thin film transistor array substrate, the method comprising:

providing a color filter substrate comprising at least one color filter layer therein;

forming at least one thin film transistor on the color filter substrate;

forming a transistor passivation layer covering the thin film transistor by backside exposure;

forming at least one terminal on the color filter substrate, wherein the terminal comprises an upper conductive line and a bottom conductive line;

forming at least one terminal passivation layer covering at least a part of the terminal by the backside exposure, wherein the transistor passivation layer and the terminal passivation layer are formed simultaneously; and depositing a transparent conductive layer and patterning the transparent conductive layer to form a transparent conductive line, wherein the transparent conductive line electrically connects the upper conductive line and the bottom conductive line of the terminal, and the transparent conductive line is formed before the transistor passivation layer and the terminal passivation layer.

9. The method of claim 8, wherein the terminal passivation layer is formed without using a mask.

* * * * *